Figure 1:
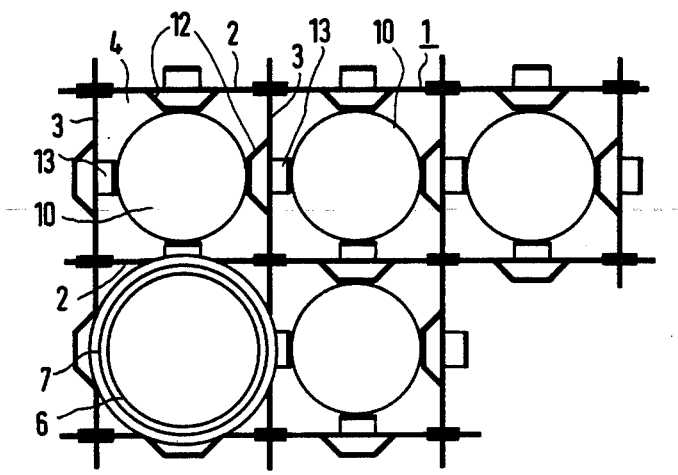

United States Patent [19]

Suchy

[11] Patent Number: 4,617,170

[45] Date of Patent: Oct. 14, 1986

[54] ASSEMBLY FOR A CORE OF A NUCLEAR REACTOR

[75] Inventor: Peter Suchy, Erlangen, Fed. Rep. of Germany

[73] Assignee: Kraftwerk Union Aktiengesellschaft, Mülheim, Fed. Rep. of Germany

[21] Appl. No.: 570,830

[22] Filed: Jan. 16, 1984

[30] Foreign Application Priority Data

Jan. 21, 1983 [DE] Fed. Rep. of Germany ....... 3301965

[51] Int. Cl.$^4$ .............................................. G21C 3/34
[52] U.S. Cl. .................................. 376/438; 376/272; 376/442; 376/446; 376/447
[58] Field of Search ............... 376/438, 442, 446, 447, 376/449, 272

[56] References Cited

U.S. PATENT DOCUMENTS 3,997,394 12/1976 Aisch .................................. 376/438
4,400,344 8/1983 Walnter ............................... 376/438

OTHER PUBLICATIONS

VGB-Kernkraftwerks-Seminar 1970, pp. 36 and 37.

Primary Examiner—Donald P. Walsh
Attorney, Agent, or Firm—Herbert L. Lerner; Laurence A. Greenberg

[57] ABSTRACT

An element for a core of a nuclear reactor, includes a square grid assembly formed of a plurality of spacers distributed over the length of the element, structural elements interconnecting the spacers, rods regularly disposed in the square grid assembly and surrounded by the spacers, including a plurality of the rods disposed at an edge of the core, and neutron-shielding material having a substantially square cross section respectively disposed in each of the plurality of rods at the edge of the core.

8 Claims, 4 Drawing Figures

ASSEMBLY FOR A CORE OF A NUCLEAR REACTOR

The invention relates to a neutron shielding assembly for a core of a nuclear reactor, wherein the assembly has rods which are regularly disposed in a square grid assembly and are surrounded by spacers, and wherein several spacers which are distributed over the length of an assembly are interconnected by structural elements.

Such a core, and particularly the construction thereof, can be seen in FIG. 9 on page 36 of the book "VGB-Kernkraftwerks-Seminar 11970". The figure shows the reactor being loaded with the individual assemblies, which in their entirety form the reactor core. An individual assembly is shown in FIG. 11 on page 37, while FIG. 10 on page 36 illustrates the so-called skeleton structure of an individual assembly, into which all of the rods are inserted. The rods have a circular cross section like the control rod guide tubes serving as the structural elements, i.e., they are cylindrical. The rods contain nuclear fuel, namely uranium oxide in the form of cylindrical pellets which are enclosed in a zirconium cladding tube. For this reason, the rods are also known as fuel rods, in contrast to absorber or control rods which are only inserted into the control rod guide tubes for reducing the reactor output and are therefore not a fixed part of the assemblies. However, assemblies of this type give off a great deal of radiation, which is harmful for the reason given below.

It is accordingly an object of the invention to provide an assembly for a core of a nuclear reactor, which overcomes the hereinafore-mentioned disadvantages of the heretofore-known devices of this general type, and to reduce the radiation emanating from the core. This can be important, for instance, because the neutron radiation, especially that of fast neutrons, can embrittle the material of the reactor pressure vessel which customarily encloses the core.

With the foregoing and other objects in view there is provided, in accordance with the invention, an assembly for a core of a nuclear reactor, comprising a square grid assembly formed of a plurality of spacers distributed over the length of the assembly, structural elements interconnecting the spacers, rods regularly disposed in the square grid assembly and surrounded by the spacers, including a plurality of the rods disposed at an edge of the core, and neutron-shielding material having a substantially square cross section respectively disposed in each of the plurality of rods at the edge of the core.

Through the use of the invention, a stronger effect is obtained by virtue of the shape of the shielding rods which extends beyond the normal cylindrical shape of fuel rods. This effect is greater than that which is possible with cylindrical shielding rods. In simpler terms, the grid mesh apertures of the spacers receiving the rods are filled with more shielding material which absorbs or also reflects neutrons. The fact that the grid mesh apertures are filled up, simultaneously yields an advantageous effect which is that the amount of coolant which passes through is reduced, because a parallel path for the coolant is closed to a greater extent in this way.

The coolant, which would otherwise be heated up less in this region than in those regions of the core in which the rods contain nuclear fuel, is thus also heated more in vicinity of the shielding rods by reducing the practically useless bypass.

In accordance with another feature of the invention, each of the rods at the edge of the core includes a cladding tube having a substantially square cross section enclosing the neutron-shielding material. This is done because reactions with the reactor coolant can be prevented in this way. In addition, it is also possible to use a mechanically unsuited material, such as lead or even liquids such as heavy water ($D_2O$).

In accordance with a further feature of the invention, each of the rods at the edge of the core have a square cross section or have neutron-absorbing material with a square cross section for enclosing the neutron-shielding material. This is done because it is then possible to make uniform shielding assemblies, such as in fuel assemblies, for instance, by using the same spacers. In addition, these assemblies can remain in the core independently of the burnup of the reactor core. However, it is also possible to only provide isolated rods of neutron-shielding material in a fuel assembly, such as in the row of rods forming the rim of the reactor core, of the assemblies located at the periphery, while the other rods are fuel rods.

In contrast to the strongly neutron-absorbing material usually employed for controlling the nuclear reactor, such as silver-indium-cadmium alloys, according to the invention steel or lead can be used which are likewise used as neutron-absorbing materials, or a zirconium alloy may be used, preferably wherein the outside of a lead or steel core is jacketed or coated with zirconium.

Therefore, in accordance with an added feature of the invention, the neutron-shielding material is steel.

In accordance with an additional feature of the invention, each of the rods at the edge of the core include a steel core and zirconium at least partly covering the steel core.

Generally, a large reflectivity can be achieved with light metals such as zirconium oxide as a neutron-shielding material, so that the neutrons are productively deflected toward the center of the core, while with heavy metals, such as lead, the absorption effect predominates. Both effects can also be advantageously combined if, in accordance with again another feature of the invention, the rods are disposed in rows of the square grid assembly, and the plurality of rods at the edge of the core are disposed in at least one of the rows at the edge of the core and in another row adjacent the at least one row toward the interior of the core, and including neutron-shielding material having a square cross section disposed in the rods of the at least one row at the edge of the core, and neutron-reflecting material disposed in the rods of the other row.

In accordance with again a further feature of the invention, the neutron-reflecting material is zirconium oxide.

For nuclear reactors with water ($H_2O$) as the coolant, a favorable shielding effect for fast neutrons is obtained if, in accordance with a concomitant feature of the invention, a given part of the cross section of the assembly is allotted to each individual rod, and each of the rods at the edge of the core fill substantially 70 to 80% of the given part.

Other feature which are considered as characteristic for the invention are set forth in the appended claims.

Although the invention is illustrated and described herein as embodied in a fuel element for a core of a nuclear reactor, it is nevertheless not intended to be limited to the details shown, since various modifications and structural changes may be made therein without departing from the spirit of the invention and within the scope and range of equivalents of the claims.

Figure 2:
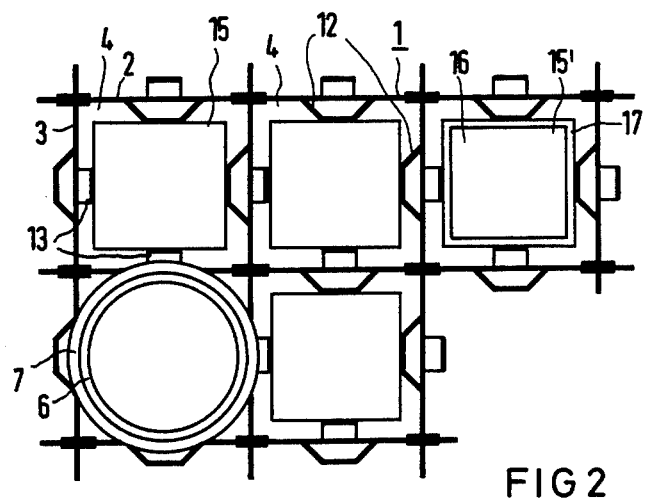
Figure 3:
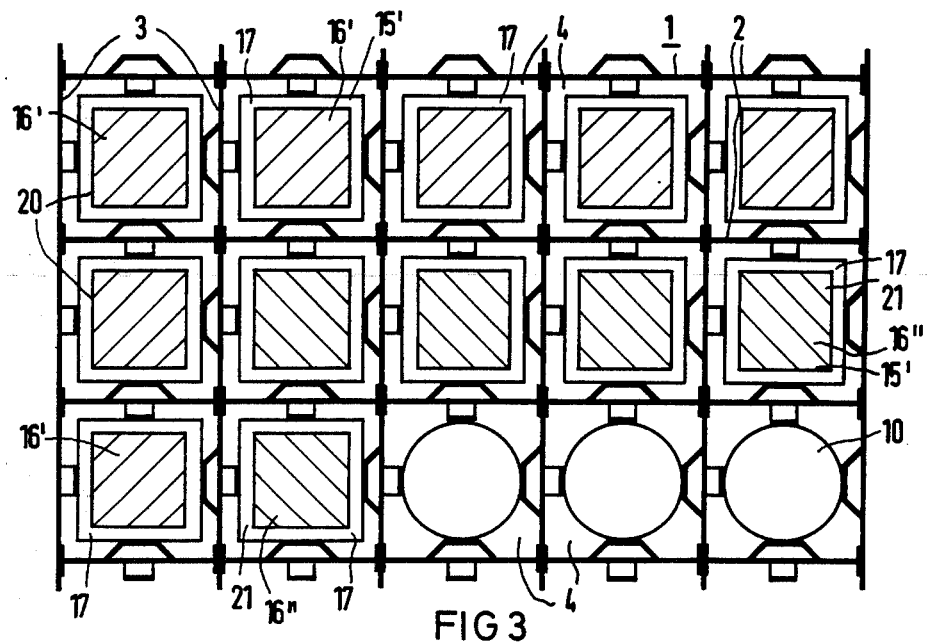
Figure 4:
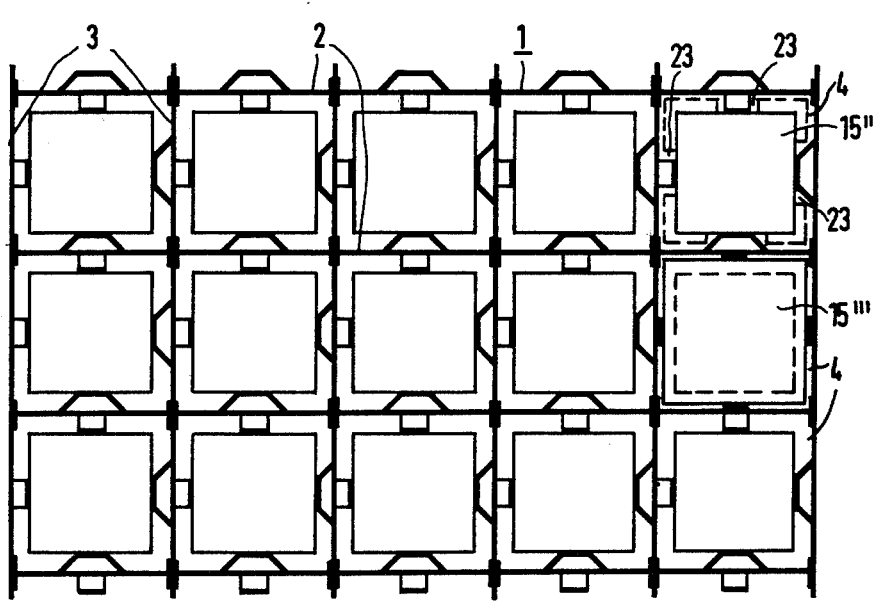

The construction and method of operation of the invention, however, together with additional objects and advantages thereof will be best understood from the following description of specific embodiments when read in connection with the accompanying drawings, in which:

FIG. 1 is a fragmentary, diagrammatic, top plan view of a prior art spacer skeleton for a fuel element; and FIGS. 2, 3 and 4 are views similar to FIG. 1, of the spacer skeletons according to the invention.

Referring now to the figures of the drawing in detail and first particularly to FIG. 1 thereof, there is seen a conventional spacer 1 of a fuel element for a pressurized-water reactor, drawn to scale.

The spacer 1 includes straight sheet metal strips 2 and 3 which are disposed at right angles to each other and enclosed regular mesh apertures 4 of a square grid. A guide tube 6 is disposed in one of the apertures, in such a way that its circular cross section just fits. The tube 6 is provided with superimposed rings 7 above and below the metal sheets 2 and 3 of the spacer 1, in such a way that several spacers 1 located on top of each other are interconnected to form a fuel element skeleton. The mesh width of the spacer is, for instance, 14.3 or 12.7 mm. The outside diameter of the guide tube 6 is exactly the same size. Rods 10 with a smaller circular cross section are disposed in the other mesh apertures 4 of the fuel element skeleton. The diameter of the rods is only 10.8 or 9.5 mm. Therefore, the rods 10 are held by indentations or bulges 12 and 13 which project from the sheet metal parts 2 and 3 into the interior of the mesh apertures 4. In the state of the art, the rods 10 are so-called fuel rods. The fuel rods contain fuel pellets of ceramically sintered uranium oxide in a zirconium tube. The nuclear fission heat developed therein is given off to water ($H_2O$) used as a coolant which flows through the core in the longitudinal direction of the rods, i.e., transversely to the plane of the drawing.

On the other hand, according to the invention as shown in FIG. 2, shielding material in the form of a steel rod 15 with a square cross section is used in the place of the rods 10 which have a circular cross section. The length of the side of the square rod 15 is 10.8 or 9.5 mm, which is the same size as the diameter of the cylindrical fuel rods. Therefore, the same spacer 1 with the same projections or bulges 12, 13 can be used and connected to the same guide tubes 6 to form a fuel element skeleton. However, the mass of the steel used for shielding is 30% larger than with cylindrical steel rods. The coolant flow which otherwise flows through the mesh apertures 4 of the spacer 1 parallel to the longitudinal direction of the rods, is also reduced to the same extent. This provides compensation for the fact that less heat is developed in the shielding rods 15 than in the fuel rods 10.

FIG. 2 also shows a rod 15' having a steel core 16 provided with a jacket 17 of zirconium. The jacket may, for instance, be vapor-deposited as a corrosion protection or applied by electroplating.

According to FIG. 2, elements can be completely filled with rods 15 and placed at the rim of a reactor core, having a central region which is formed of normal elements according to FIG. 1. However, a sufficient shielding action may possibly be obtained even if only one row or several rows facing the periphery, are provided in the form of shielding rods 15 instead of in the form of the fuel rods otherwise provided in the neutron shielding assemblies.

In FIG. 3, embodiment is shown, in which the outer row 20 in an a neutron shielding assembly is provided with rods 15', having a zirconium cladding tube 17 which contains a lead core 16' as the neutron-absorbing material. On the other hand, the adjacent row 21 closer to the interior of the core, has cladding tubes 17 of the rods 15' which contain a core 16" of zirconium oxide or $D_2O$ which in particular shields the fast neutrons by reflection. The remainder of the spacer 1 includes fuel rods 10.

In the embodiment according to FIG. 3, the rows 20 and 21 extend at right angles because the neutron shielding assembly is meant to be used for a corner at the outside of the core. For neutron shielding assemblies having an outside corner which lies on a straight part of the core periphery, the rows 20, 21 would extend straight and parallel to each other. Furthermore, absorbing and reflecting materials 16', 16" could also be provided in several respective rows.

FIG. 4 shows that the cross section of the neutron-shielding material of a rod 15" can also be increased beyond the dimensions of the fuel rod diameter, while retaining the spacer 1 shown in FIG. 1. The points of engagement of the projections 12, 13 of the spacer 1 then lie in depressions 23 of the square cross section, shown by dotted lines. If the spacer 1 which is customary for cylindrical fuel rods is dispensed with, the square cross section can be made still larger. The neutron-shielding material of such rods 15''' then covers about 80% of the area of the grid mesh aperture 4 and thus reaches the maximum shielding effect with the largest heating span of the bypass flow of the coolant.

The foregoing is a description corresponding in substance to German application No. P 33 01 965.7, filed Jan. 21, 1983, the International priority of which is being claimed for the instant application, and which is hereby made part of this application. Any material discrepancies between the foregoing specification and the aforementioned corresponding German application are to be resolved in favor of the latter.

I claim:

1. Neutron shielding assembly of a reactor core assembled from nuclear reactor fuel assemblies and neutron shielding assemblies, comprising a square grid assembly formed of a multiplicity of spacers distributed over the length of the assemblies and structural elements interconnecting said spacers defining inner and outer rows, and respective rods orderly disposed in said square grid assembly and surrounded by said spacers, said rods of said nuclear reactor fuel assemblies being individual cylindrical fuel rods and said rods of said neutron shielding assemblies being metal rods with square cross sections, and said neutron shielding assemblies disposed at an edge of the reactor core having additional metal rods with square cross sections attenuating neutron radiation emanating from the periphery of the reactor core, the additional metal rods lying at least in one of said outer rows of the neutron shielding assembly.

2. Neutron shielding assembly according to claim 1, wherein each of said rods at the edge of the reactor core have a neutron shielding assembly formed of metal and have a square cross section.

3. Neutron shielding assembly according to claim 1, wherein said metal is steel.

4. Neutron shielding assembly according to claim 2, wherein said metal is steel.

5. Neutron shielding assembly according to claim 1, wherein each of said metal rods with square cross sections include a steel core and zirconium at least partly covering said steel core.

6. Neutron shielding assembly according to claim 1, wherein said rods with square cross sections in at least one of said outer rows at the periphery of the reactor core are formed of neutron absorbing metal, and said rods with square cross sections in at least one of said inner rows adjacent said at least one outer row are formed of neutron reflecting material.

7. Neutron shielding assembly according to claim 1, wherein said spacers and structural elements define grid mesh apertures therebetween each having a given area allotted to each individual rod, and each of said rods with square cross sections fill substantially 70 to 80% of said given area.

8. Neutron shielding assembly according to claim 7, wherein said spacers have projections received in depressions formed in said rods with square cross sections.

* * * * *